Feb. 19, 1952   T. H. AFFLECK   2,586,196
RELAY EMERGENCY AIR BRAKE VALVE
Filed Aug. 16, 1947
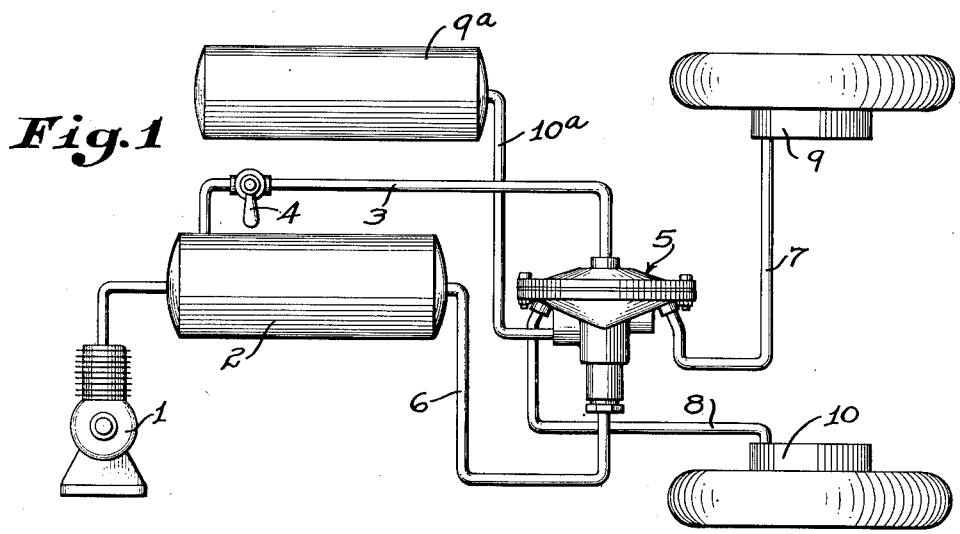
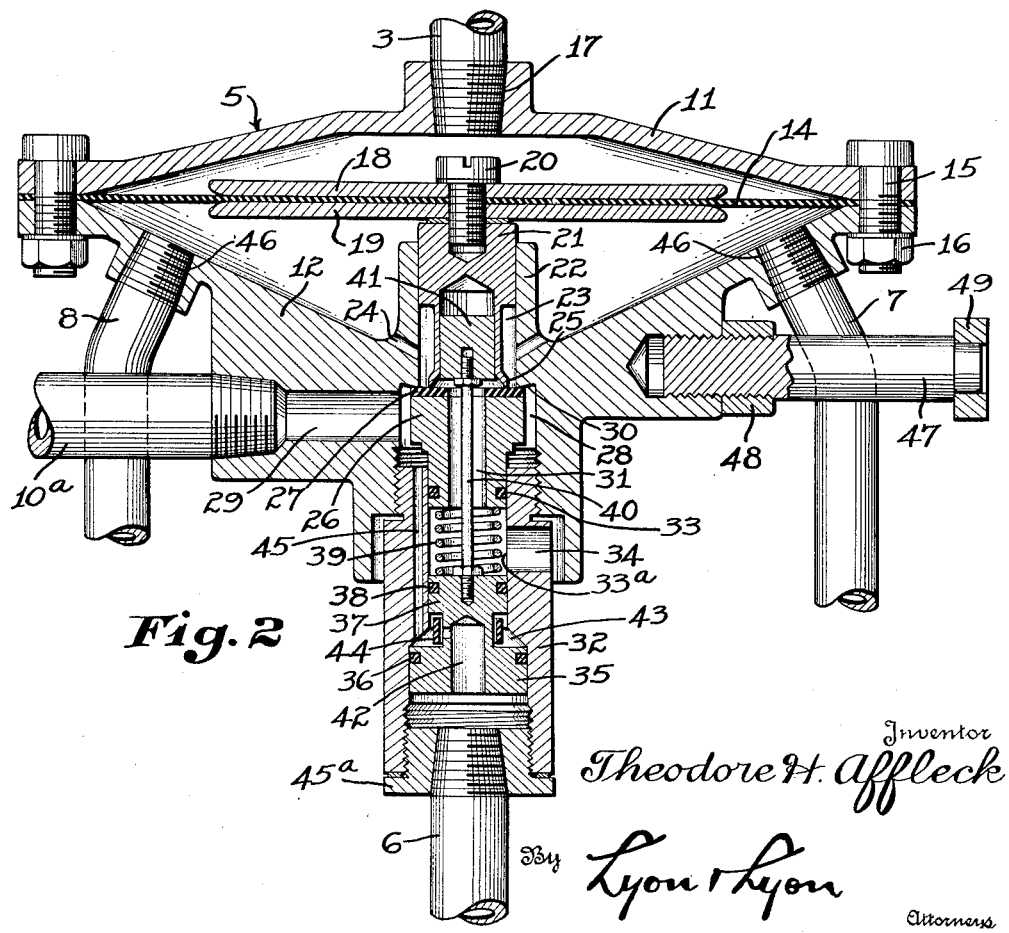
Inventor
Theodore H. Affleck
By Lyon & Lyon
Attorneys

UNITED STATES PATENT OFFICE 2,586,196

RELAY EMERGENCY AIR BRAKE VALVE

Theodore Hubbard Affleck, North Hollywood, Calif., assignor to Homer T. Seale, Inc., Los Angeles, Calif., a corporation of California Application August 16, 1947, Serial No. 769,036

10 Claims. (Cl. 303—26)

This invention relates to a valve mechanism designed for use on trailer brakes, particularly in connection with trailer brakes actuated by air pressure.

For the operation of trailer brakes it is normally required that there be provided a separate supply tank on the trailer for actuating the trailer brakes. This separate supply tank receives its pressure from the main supply tank on the truck, but by being located on the trailer it allows the application of the trailer brakes to occur simultaneously, in some instances, slightly earlier than the application of the truck brakes. To control this operation from the truck there is provided on the trailer a valve apparatus which contains a relay valve which regulates application of pressure from the trailer tank to the brakes and the exhaust of pressure from the brakes in response to the operation of a service line, which service line contains a valve mechnaism connected with the brake system. As a safety requirement to cover the eventuality that the trailer becomes separated from the truck, or the air pressure lines connecting the trailer and truck be broken, it is necessary that the valve means on the trailer include devices responsive to the breaking of line between the truck and trailer for automatically setting the trailer brakes by connecting the brakes with the trailer tank.

The valve apparatus in general use for controlling trailer brakes has heretofore required the use of two sets of valves and two sets of operating devices for controlling the passage of pressure from the trailer tank to the brakes, one operated by the service line and one operated for emergency conditions; or, where a single valve has been used both for service and emergency operations, has necessitated that any emergency operations actuate the relay valve mechanism, including the ordinary relay valve diaphragm. As a result, prior valve apparatus useful for controlling trailer brakes have necessitated the employment of a large number of parts.

One object of the present invention is to provide valve apparatus for trailer brakes which is of more simple construction than those heretofore utilized. More particularly, it is an object of the present invention to provide a valve apparatus in which a single valve member is employed in both service operations and emergency operations, but which valve apparatus does not require the actuation of the relay mechanism used in service operations to perform an emergency operation.

By means of the present invention a valve apparatus is provided which includes only a single diaphragm and a single spring, and requires no movement of any spring or diaphragm for emergency operation.

Another advantage of the valve apparatus of the present invention is that the single valve member of the present invention, which is responsive both in service operations and emergency operations, is nearly pressure balanced with respect to the pressure from the trailer tank, so that it is very quickly responsive in operation and may be operated by low pressures. The valve mechanisms in general use for operating trailer brakes require such high pressure for operating the relay mechanism that it is difficult to obtain sufficient rapid application of the trailer brakes from the service line. Attempts have been made to solve this by feeding pressure from the service line to the trailer brakes in advance of the opening of the valve connecting the trailer tanks with the trailer brakes. By means of the present invention rapid operation is effected without introducing the complications of such pressure feeding devices.

A further advantage of the valve apparatus of the present invention is that it is designed so that the pressure in the trailer tank equalizes with the pressure in the main supply tank on the truck, whereas, with apparatus heretofore designed the pressure of the trailer tank is normally below that pressure of the main supply tank in an amount equal to the pressure required to operate the check valve.

Another advantage of the present invention is that the valve apparatus eliminates danger of undesired and unwanted emergency operations. These undesired and unwanted emergency operations occur in prior valve mechanisms in case the air pressure in the main supply tank falls under approximately fifty pounds pressure. With prior valve mechanisms this has resulted in a frequent, unwanted emergency application of the trailer brakes. The valve apparatus of the present invention is so constructed that the line must be broken or substantially all air pressure removed from the truck tank before emergency operations can occur.

Another advantage of the present invention resides in the fact that substantially the entire operating mechanism of the value apparatus is mounted and supported by one supplemental housing, both service and emergency, so that it is detachable from the main body of the casing of the valve apparatus and removable for repair or replacement. These prior valve apparatus have been very difficult to replace or repair, damaged parts generally necessitating disconnection of all lines from the apparatus and the bodily removal of the apparatus for repair.

The valve and mechanism of the present invention, together with further advantages of the same, will be more fully understood from the following description of the preferred example of the invention. For this purpose the invention is described in connection with the accompanying drawings in which:

Figure 1 is a schematic view of a truck trailer braking system in which is embodied the present invention.

Figure 2 is an enlarged vertical section of the valve structure.

Referring to the drawings, the truck trailer braking system in which the valve mechanism of the present invention is employed may comprise a source of pressure such as a compressor 1, which supplies air to a main reservoir or supply tank 2. From the main reservoir 2 the air pressure may be applied through either the service line 3 controlled by valve 4 to the emergency relay valve 5, or may be supplied through the emergency line 6 to the relay emergency valve 5. The valve 4 is actuated by the driver of the truck. From the emergency relay valve 5 lines 7 and 8 lead to power cylinders 9 and 10 which are intended for actuating the trailer brakes. On the trailer is provided a tank 9a connected to the valve apparatus 5 by a line 10a.

The emergency relay value 5 of the present invention comprises a body including an upper casing member 11 and a lower casing member 12, between which is clamped the diaphragm 14 by bolts 15 having nuts 16. The service line 3 connects with a concentric opening 17 in the upper casing member 11 to control the pressure of the space between the diaphragm 14 and upper casing member.

The diaphragm 14 is provided with plates 18 and 19 which are clamped by a bolt 20, which in turn is actuated to the follower 21, guided in a hollow nipple 22 which is part of the lower casing member 12 and extends upwardly into the space below the diaphragm 14. The follower 21 is reduced in order to provide an annular passage 23 which may communicate with the space below the diaphragm 14 through slots 24 in the nipple 22. The lower end 25 of the follower 21 acts as a valve head being intended to engage a valve member 26 which is provided at its upper face with soft resilient packing material or valve seat 27 of rubber or other suitable material.

The valve member 26 is movably positioned within an enlarged bore 28 which communicates with a port 29 to which is connected the trailer tank line 10a. The valve member 26 is sufficiently large in diameter so as to contact the shoulder 30 on the casing member 12 above the enlarged recess 28. In this position the valve member 26 shuts off communication between the passage 23 and the space outside of the valve member 26 provided by the enlarged bore 28. The valve member 26 is provided with a bore 31 and communcation between the space 23 and the bore 31 is under control of the valve head 25 on the lower end of the follower 21. The pressure which in operation is exerted from the trailer tank 9a against the valve member 26 is nearly balanced. That is to say, the pressure from the trailer tank forcing the member 26 upwardly is only that exerted on the shoulder of the member 26, while there is a downward pressure on the member 26 up to the point of contact of the seat 27 with the casing. These differences are thus very small, so that little pressure is exerted to hold valve member 26 in a closed position.

A lower body member 32 is threaded to the lower casing member 12 and is provided with a bore 33a, the upper end of which forms a guide for the valve member 26. A packing ring 33 is in a groove provided at the lower end of the valve member 26 to form an air-tight connection between the valve member and lower body member 32. An exhaust port 34 is provided in the lower body member 32. At the lower end the bore 33a is enlarged to receive the enlarged end of a plunger 35 which is provided with a packing ring 36 in the groove of the plunger 35 for forming an air-tight connection with the lower body member. The plunger 35 also has a reduced section 37 fitting in the lower end of the bore 33 and having the packing ring 38 for making a fluid-tight connection therewith.

The reduced end 37 seats the lower end of a coil spring 39, the upper end of which yieldingly urges the valve member 26 upwardly as viewed in the figure. The reduced end 37 of the plunger 35 is attached as indicated to a rod 40 and at its upper end is attached to a block 41, in turn having a sliding fit with the follower 21. By this construction movement of the diaphragm 14 causes a corresponding movement of the follower 21. The motion of the valve member 26 is in part controlled by the movement of the diaphragm 14 and in part by the forces exerted on the spring 39, and the air pressure in cavity 28 against the difference of area between hole 23 and the reduced portion of member 26.

The lower plunger 35 as shown is provided with an axial opening 42 which connects with an annular recess 43 through ports controlled by a valve member 44. A valve member 44 in the form of a resilient band acts as a check valve allowing the flow of air under pressure from bore 42 to the annular recess 43, inhibiting reverse flow. From the annular recess 43 there leads a vertical port 45 leading into the bore 28 around the valve member 26.

At the lower end of the body member 32 is threaded a cap 45a by which connection is made to the line 6. The lower body member 12 has two outlets 46 by which the lines 7 and 8 leading to the trailer brake plungers may be connected to the space between diaphragm 14 and the lower casing member 12.

The relay emergency valve apparatus operates as follows: The trailer tank 9a is maintained at a pressure at least equal to that of the truck tank 2 since whenever the pressure of the truck tank 2 exceeds that of the trailer tank 9a, air flows from line 6 into the valve apparatus opening the check valve 44 and passing hence through bore 45, through the outlet 29 to the trailer tank. Since there is no spring maintaining the resilient band at 44 in closed position, substantially no resistance is offered to the flow of air into the trailer tank, so that the pressure in the trailer tank becomes substantially the same as the pressure in the supply tank. If by any accident or defect in the system connections between the trailer and truck are broken, there exists a supply of air pressure suitable for setting the trailer brakes. When the brake is operated by opening valve 4 air pressure is supplied above the diaphragm 14 to force the diaphragm 14 downwardly. This moves valve member 26 downwardly away from the seat 30 allowing the flow of air from the trailer tank through the annular space 23 into space below diaphragm 14, from which the air is conducted to the plungers 9 and 10 of the trailer brakes actuating the trailer brakes. To release the trailer brake valve 4 is closed and the pressure above the diaphragm 14 is rapidly released so that the pressure now developed below the diaphragm 14 will cause the diaphragm 14 to move upwardly. This closes valve member 26 against its seat 30 shutting off communication between trailer tank 10a and the space below diaphragm 14, while at the same time it raises the lower end 25 of the follower 21 from the valve member 26, establishing an exhaust connection so that the air in the brake plungers 9 and 10, and below the diaphragm 14, may be exhausted through the bore 31 and exhaust outlet 34. As this air is exhausted diaphragm 14 moves downwardly again to bring the lower end 25 against the valve member 26 to close the exhaust outlet.

In case the connection between the trailer and the truck should be broken, the pressure of air within the trailer tank operating against the plunger 35, due to the step construction of this member, will act to force this member downwardly which in turn moves the block 41 downwardly, first closing exhaust hole 31, and then releasing the valve member 26 from its seat 30 so that the pressure from the trailer tank may be applied to the trailer brakes for setting the brakes. The surfaces of the various parts in body member 32 against which the pressure from the trailer tank is exerted are so proportional, however, that the air from the trailer tank will not thus operate the valve until substantially all air pressure from the truck tank against the bottom surface of the plunger 35 has been removed. In this way the valve apparatus of the present invention avoids any undesired emergency application of the trailer brakes. Thus, for example, if 105 pounds of pressure were set up in the trailer tank and then for some reason the pressure of the truck tank dropped to 50 or 60 pounds pressure, such a differential would be insufficient when acting on the surfaces of the plunger 35 to set the emergency brakes, and thus undesired dangerous operation is therefore avoided.

The valuable feature of the present invention resides in the fact that the body member 32 carries in a single unit substantially all of the operating parts of the valve apparatus both for service and emergency operations (excepting the diaphragm 14 and its follower 21) so that by unscrewing the line 6 from its member and in turn unscrewing the body 32 from the body member 12, substantially all parts of the mechanism may be removed as a small unit for examination, repair, or replacement.

There is also indicated a mounting bolt 47 attached to the lower casing member 12 and held thereto by a nut 48. This mounting bolt 47 is used for supporting valve apparatus in position on the trailer by a member such as indicated at 49.

While the particular form of apparatus herein described is well adapted to carry out the objects of the present invention, it is to be understood that various modifications and changes may be made and this invention is of the scope set forth in the appended claims.

I claim:

1. A relay emergency valve for controlling the application of pressure from a source of pressure to brake chambers and the release of pressure from brake chambers in response to the pressure variations in a service line and effective for establishing application of pressure from said source to said brake chambers in response to loss of pressure from an emergency line, which valve comprises a body providing a passage for connection between said source of pressure and brake chambers, a valve member movable to open and close said passage, said valve member having an exhaust opening therethrough, a relay diaphragm responsive to the pressure variations in the service line, a follower movable into contact with said valve member for first closing said exhaust opening and then moving said valve member to so open and close said passage, and a piston connected to a block also movable to close said exhaust opening, said piston being normally moved by pressure from an emergency line to move said block from said exhaust opening but movable on a loss of said pressure for closing said exhaust opening and moving said valve member to open said passage.

2. A relay emergency valve for controlling the application of pressure from a source of pressure to brake chambers and the release of pressure from brake chambers in response to the operation of a service line and effective for establishing application of pressure from said source to said brake chambers in response to loss of pressure from an emergency line, which comprises a body having a passage for connection of such source of pressure and brake chambers, a valve member mounted in said body and normally moved by pressure from variations from said source into positions to open and close said passage, said valve member having an exhaust passage therethrough, a plunger mounted in said body and connected to a head movable to close said exhaust passage and to move said valve member to open said passage, said body having a port for applying pressure from said emergency line to said plunger to normally move said plunger into position to open said exhaust passage, said plunger being movable by pressure from said source to close said exhaust and open said valve member on loss of pressure from said emergency line, and independent means for closing said exhaust passage and moving said valve member in response to operations of a service line, said means including a diaphragm and a follower.

3. A relay emergency valve for operation of brakes in connection with a service line, emergency line and source of pressure, which comprises, a body having a passage for connection of a source of pressure to a brake chamber, a valve member movable to open and close said passage and having an exhaust passage therein, a plunger carrying a block movable to engage said exhaust passage for closing the same and moving the valve member to open said passage, said body having a port for applying pressure from an emergency line against said plunger, the block of said plunger being normally moved to a disengaging position by application of emergency pressure to said plunger but being movable on loss of said emergency pressure to effect opening of said valve member, and a relay operator for said valve member responsive to a pressure valve in said service line for closing said exhaust passage and moving said valve member to the open position.

4. A relay emergency valve for operation of brakes in connection with a service line, emergency line and source of pressure which comprises, a body having a passage for connection of a source of pressure to a brake chamber, a valve member movable to open and close said passage and having an exhaust passage therein, a plunger having a block movable against said exhaust passage for closing the same and moving the valve member to open said passage, a port for applying pressure from such emergency line to such plunger, the block of said plunger being normally moved to a disengaging position by application of emergency pressure but being movable on loss of said emergency pressure to effect movement of said valve member to open said passage, and a relay operator for said valve member responsive to a pressure variation in said service line for closing said exhaust passage and moving said valve member to open said passage, said plunger having a passage provided with a check valve for supplying pressure from said emergency line to said source.

5. A valve comprising, a body having a bore and a shoulder in said bore, a valve member having an exhaust opening movable in said bore and having a seal at one end with said bore, the other end of said valve member being movable into engagement with the shoulder, a port leading to said bore between said shoulder and the seal of said valve member, a plunger mounted in said bore beyond the seal of said valve member and having a seal with said bore, means resiliently connecting said plunger and valve member, a passage axially through said valve member leading to the space of said bore between said seals, an exhaust port connected to said bore at said space, and a block connected to said plunger movable to close said exhaust opening.

6. A valve comprising, a body having a bore and a shoulder in said bore, a valve member movable in said bore, having one end sealed to said bore, the other end of said valve member being movable into engagement with the shoulder, a port leading to said bore between said shoulder and the seal of said valve member, a plunger mounted in said bore beyond the seal of said valve member and sealed to said bore, means resiliently connecting said plunger and valve member, a passage axially through said valve member leading to the space of said bore between said seals, a port connected to said bore at said space, and a block connected to said plunger movable to close said bore, and a diaphragm having a follower movable to close said bore through said valve member and to move said valve member to open said bore.

7. A valve apparatus comprising, a body having a bore and a shoulder in said bore, a valve member mounted in said bore and having one end movable against said shoulder for closing said bore, said valve member having a seal with said bore at the other end, a port through said body connecting with said bore between said shoulder and seal, a plunger movable in said bore beyond said seal and having a seal with said bore a second port through said body connecting with said bore between the seal of said valve member and the seal of said plunger, said valve member having an axial passage connected to said latter port, and a block carried by said plunger movable into position to close said axial passage.

8. A valve apparatus comprising, a body having a bore and a shoulder in said bore, a valve member mounted in said bore and having one end movable against said shoulder for closing said bore and having a seal with said bore at the other end, a port through said body connecting with said bore between said shoulder and seal, a plunger movable in said bore beyond said seal and having a seal with said bore, a port through said body connected to said bore between said seals, said valve member having an axial passage connected to said latter port, and a block carried by said plunger movable into position to close said passage through said valve member, and a spring between said valve member and plunger.

9. A valve apparatus comprising, a body having a bore and a shoulder in said bore, a valve member mounted in said bore and having one end movable against said shoulder for closing said bore and having a seal with said bore at the other end, a plunger movable in said bore beyond seal and having a seal with said bore, a port connected to said bore between said seals, said valve member having an axial passage connected to said port, a block carried by said plunger movable into position to close said passage through said valve member, a spring between said valve member and plunger, and a relay diaphragm and follower movable into position to close the passage of said valve member and move the same relative to said shoulder.

10. A valve comprising a body having a bore with a shoulder, a valve member movable in said bore, having one end sealed to said bore, the other end of said valve member being movable into engagement with said shoulder, a port leading to said bore between said shoulder and the seal of said valve member, a plunger mounted in said bore beyond the seal of said valve member and having two spaced apart seals with said bore, means resiliently connecting said plunger and valve member, a passage axially through said valve member leading to the space of said bore between the seal of said valve member and one of the seals of said plunger, a port connected to said bore at said space, a block connected to said plunger movable to close said bore, said plunger having a passage, including a check valve, and connecting to the base of said bore between the seals of said plunger, and a passage in said body leading from said latter space to the space of said bore between said shoulder and the seal of said valve member.

THEODORE HUBBARD AFFLECK.

REFERENCES CITED

The following references are of record in the file of this patent:

UNITED STATES PATENTS

| Number | Name | Date |
|---|---|---|
| 2,049,984 | Vorech | Aug. 4, 1936 |
| 2,135,007 | Kamenarovic | Nov. 1, 1938 |
| 2,380,507 | Eaton | July 31, 1945 |
| 2,411,406 | Affleck | Nov. 19, 1946 |
| 2,289,559 | Turek | July 14, 1947 |